June 2, 1970    A. J. STONE    3,515,445
CONVEYOR BEARING

Original Filed Jan. 23, 1967    2 Sheets-Sheet 1

INVENTOR.
ALAN J. STONE
BY Albert Q. Maharsel
ATTORNEY

June 2, 1970  A. J. STONE  3,515,445

CONVEYOR BEARING

Original Filed Jan. 23, 1967

INVENTOR.
ALAN J. STONE
BY
ATTORNEY

United States Patent Office 3,515,445
Patented June 2, 1970

3,515,445
CONVEYOR BEARING
Alan J. Stone, Honeoye, N.Y., assignor, by mesne assignments, to Murray Company of Texas, Inc., a corporation of Delaware
Continuation of application Ser. No. 610,908, Jan. 23, 1967. This application Oct. 28, 1968, Ser. No. 771,702
Int. Cl. F16c 13/00, 27/02
U.S. Cl. 308—20                                       1 Claim

ABSTRACT OF THE DISCLOSURE

A plastic bearing for conveyor rollers having a hub portion, an outer rim portion and support elements interconnecting said hub and rim formed and arranged to absorb forces of pressure applied to the outer rim as it is pressed into said roller, thereby preventing distortion of the hub.

This application is a continuation of application Ser. No. 610,908, filed Jan. 23, 1967.

BACKGROUND OF THE INVENTION

The invention relates to article handling conveyors of the type which utilize endless belts for supporting articles to be conveyed and freely rotatable rollers for supporting and guiding said belts.

These freely rotatable rollers are commonly fabricated from standard tube or pipe stock with bearing members assembled in each end thereof with the combination being supported for rotary motion by a centrally disposed rod or shaft extending therethrough.

In many conveyor installations it has been found advantageous to utilize bearings in the ends of the rollers which do not require lubrication, and plastic bearings in their many available types have been found to meet the requirements of such installations. However, the rollers themselves, being made from standard tube or pipe stock, are manufactured with a dimension of the inside diameter which is not considered critical or held within close specified tolerances. To insure an adequate press fit of the bearings in this form of roller it is necessary that it be made with an outside diameter of sufficient size to accommodate the variations in tolerances of the inside diameters of these rollers. On frequent occasions the fit between the bearing and its respective roller is quite tight and with the known forms of plastic bearings the pressure required to assemble the bearing is sufficient to cause distortion of the hub portion and interference with the supporting shaft adapted to extend therethrough.

The bearing according to the instant invention includes a hub portion and outer rim; however, the means interconnecting these elements of the bearing are arranged and formed so as to absorb the forces of pressure applied to the outer rim when pressed into the end of a roller thereby eliminating the problems of distorting the bearing's hub portion and interference with its supporting shaft. Additionally, the means interconnecting the bearings hub and rim according to the invention provides a substantially improved resistance to shock loads compared to the known types of bearings of the prior art.

SUMMARY OF THE INVENTION

The conveyor bearings according to the instant invention are adapted to form the ends of a belt conveyor's freely rotatable belt supporting and guide rollers.

The bearings are assembled by means of a press fit into the ends of each roller member. The preferred form of bearing includes an annular rib disposed intermediate the hub portion and outer rim having a plurality of integrally formed and radially extending spoke members alternately disposed in spaced relation which interconnect the hub and rim with said annular rib.

Modifications of the invention include novel spoke members which are formed and disposed in a manner to prevent the effects of external pressure and shock loads from being transmitted to the hub portion of the bearings and may be defined as being angularly disposed to a radius through the hub and outer rim. Such spoke members would function satisfactorily in a variety of forms such as being off-set or reversely curved.

DESCRIPTION OF THE PREFERRED EMBODIMENT

Referring now to the figures of drawing, conveyor roller bearings are shown that are fabricated from materials which are compressible such as plastic resins and elastomers.

Figures 1, 2:
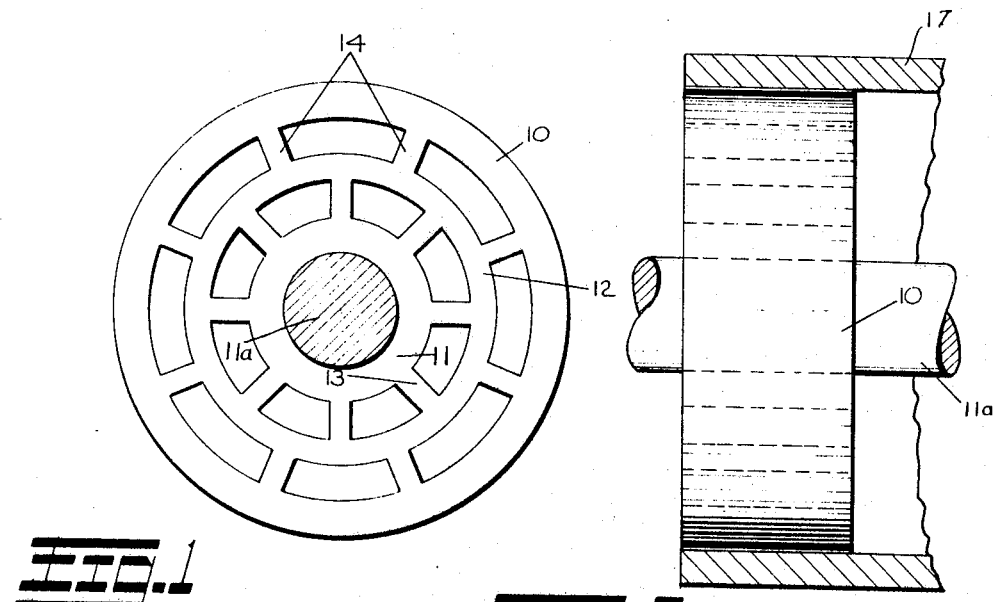
FIG. 1 is an end view showing the preferred embodiment of the invention as heretofore described.
FIG. 2 is a view in side elevation of the bearing member shown in FIG. 1 and FIGS. 3, 4, 5, 6, 7 and 8 are views similar to those of FIGS. 1 and 2 but showing modification of the preferred embodiment.

The preferred form of bearing shown in FIGS. 1 and 2 includes an outer rim 10, a centrally disposed hub portion 11 and an annular rib disposed intermediate said rim and hub which is identified by numeral 12. A plurality of integrally formed, equally spaced and radially extending spoke members 13 interconnect the hub portion 11 through which a shaft 11a extends with the annular rib 12. A second plurality of spoke members interconnects the annular rib 12 with the outer rim 10 and these are identified by numeral 14. Spoke members 14 are also disposed in spaced relation but are alternately positioned relative to spoke members 13.

Figures 3, 4:
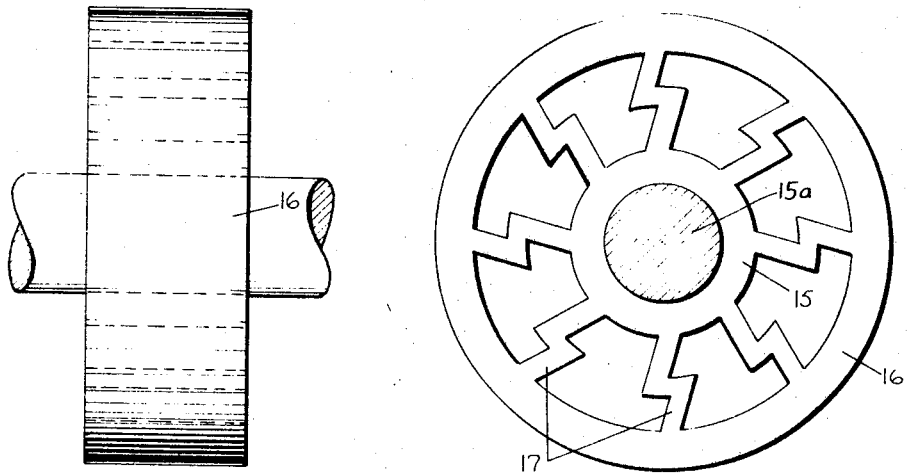

In the modification shown in FIGS. 3 and 4, the hub portion is depicted by numeral 15 and the outer rim by numeral 16. A plurality of integrally formed, non-linear or off-set spoke members 17 disposed in spaced relation interconnect the hub portion 15 through which a shaft 15a extends with the outer rim 16.

Figure 5:
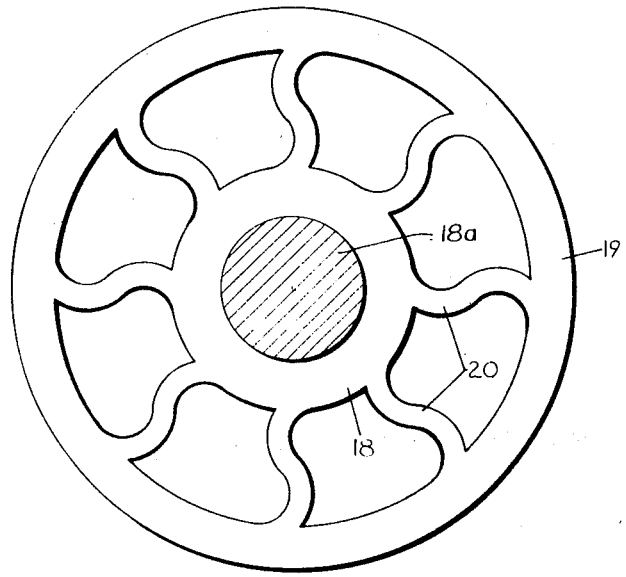
Figure 6:
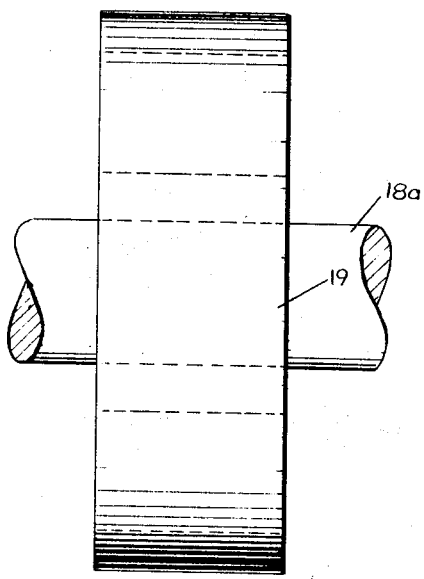

In FIGS. 5 and 6, the hub of the bearing is identified by numeral 18 through which a shaft 18a extends the outer rim by numeral 19 and the several integrally formed curvilinear or reversely curved spoke members 20 interconnect the hub and rim.

Figure 8:
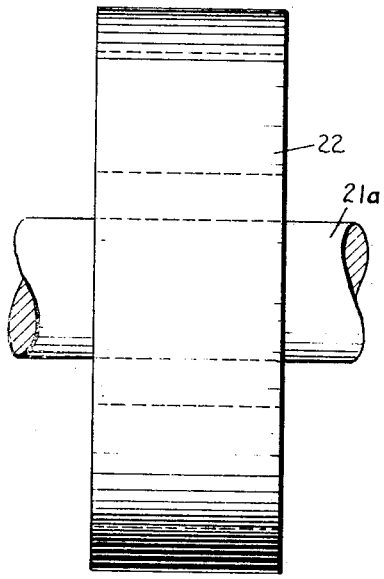
Figure 7:
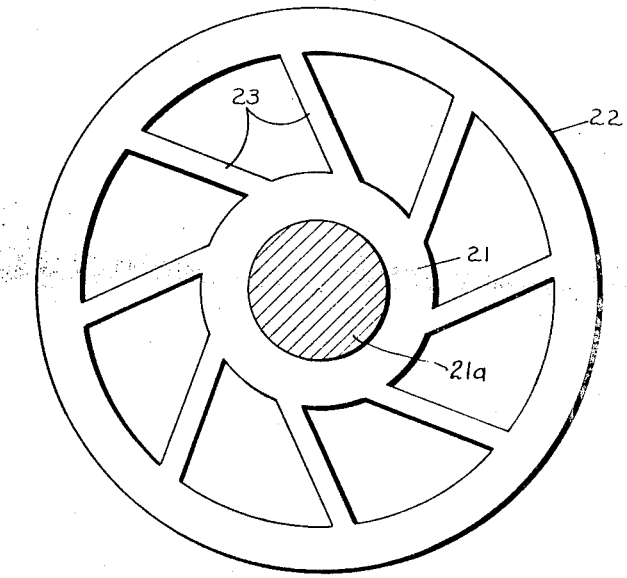

FIGS. 7 and 8 show a further modification of the conveyor bearing having a hub 21 through which a shaft 21a extends an outer rim 22 and a plurality of straight spoke members 23 which are angularly disposed to a radius through the rim and hub elements.

When the bearing shown in FIGS. 1 and 2 is assembled by pressing it into the ends of a conveyor roller 17, the forces of pressure to which the outer surface is subjected are transmitted through spoke members 14 and taken up by the annular rib 12. Unlike the conventional straight and radially directed spoke members of known bearings the hub portion of the bearings comprising the invention is not subjected to these forces which are known to distort said hub and cause interference with the supporting shaft.

The spoke members shown in the modifications of FIGS. 3, 5 and 7 are formed and arranged to absorb the forces of pressure applied to their respective rims without transmitting the same to the centrally disposed hub portions. This is easily understood for the spoke members being angularly disposed with respect to a radius through the hub and rim will be subject to a slight distortion rather than the hub.

While one embodiment of the invention has been disclosed, it is to be understood that the inventive concept may be carried out in a number of ways. This invention is, therefore, not to be limited to the precise details described, but is intended to embrace all variations and modifications therof falling within the spirit of the invention and the scope of the claim.

I claim:

1. In combination with a shaft, a conveyor bearing for supporting an endless belt guide roller for rotation on said shaft, said bearing including
   (a) a centrally disposed hub through which said shaft extends,
   (b) an outer cylindrical rim free of any outwardly extending external projections, said rim assembled into pressing contact with an inner surface of said roller, and
   (c) pressure absorbing means adapted to absorb compressive forces directed against said cylindrical rim without transmittal thereof to said hub comprising a plurality of equally spaced and radially extending deformable spoke members having inner and outer end portions co-extensive with said hub and cylindrical rim, and being off set at points intermediate their ends.

References Cited

UNITED STATES PATENTS

| | | | |
|---|---|---|---|
| 2,159,545 | 5/1939 | Bartosch | 308—26 |
| 2,614,896 | 10/1952 | Pierce | 308—184 |
| 3,285,532 | 5/1965 | Loch | 308—15 |
| 3,018,146 | 1/1962 | Euwe et al. | 308—20 |
| 3,361,914 | 1/1968 | Janssen | 308—238 |
| 3,395,949 | 8/1968 | Kun | 308—26 |
| 2,885,583 | 5/1959 | Zunick et al. | 308—184 |

FOREIGN PATENTS

| | | |
|---|---|---|
| 1,375,550 | 9/1964 | France. |

MARTIN P. SCHWADRON, Primary Examiner

U.S. Cl. X.R.

308—26